United States Patent Office 3,558,548
Patented Jan. 26, 1971

3,558,548
SHAPED OBJECT COMPRISING A SOLID SOLUTION OF CERTAIN QUANTITIES OF A LINEAR THERMOPLASTIC POLYESTER RESIN DISSOLVED IN CERTAIN DIHYDROXY BENZENE COMPOUNDS
Edward P. Weierter, Massapequa, N.Y., assignor to American Cyanamid Company, Stamford, Conn., a corporation of Maine
No Drawing. Continuation-in-part of application Ser. No. 755,713, Aug. 27, 1968. This application Jan. 2, 1969, Ser. No. 788,648
Int. Cl. B32b 27/36; C08f 45/34
U.S. Cl. 260—33.4                                         10 Claims

ABSTRACT OF THE DISCLOSURE

A shaped object comprising a solid solution of from about 2% to 20% by weight of a linear thermoplastic polyester resin dissolved in a dihydroxy benzene compound having the formula:

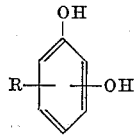

wherein R is a member selected from the group consisting of hydrogen, alkyl groups containing from 1 to 4 carbon atoms, chlorine and bromine.

CROSS REFERENCE TO RELATED APPLICATION

This application is a continuation-in-part of my earlier application having the Ser. No. 755,713, filed Aug. 27, 1968 and entitled "Thermoplastic Polyester Resin Films Bonded Together to Form a Laminate Using Certain Dihydroxy Benzene Compounds as the Bonding Agent."

BACKGROUND OF THE INVENTION

Thermoplastic linear polyester resin films are commercially available from a plurality of sources and a plurality of methods have been devised to accomplish a bonding of one such thermoplastic polyester film to another film of the same description. Some adhesive materials have been used for this purpose and in other instances bonding of two of these films together has been accomplished merely by the application of heat and pressure. An adhesive stick or pencil on the character of a shaped object, if discovered, could prove to be useful in applying an adhesive layer to those areas of the polyester film to be bonded to another layer of the same film.

FIELD OF THE INVENTION

The present invention is in the field of a shaped object comprising a solid solution of a linear thermoplastic polyester resin dissolved and uniformly dispersed in certain dihydroxy benzene compounds wherein the shaped object may be in the form of an adhesive stick or an adhesive pencil which permits the use of such a formed object to apply an adhesive layer to a linear thermoplastic polyester film preparatory to bonding said adhesive coating film to another layer of the same film.

DESCRIPTION OF THE PRIOR ART

The instant applicant is not aware of any reference which is truly pertinent to the present invention.

SUMMARY OF THE INVENTION

This invention relates to a shaped object comprising a solid solution of from about 2% to 20% by weight of a linear thermoplastic polyester resin dissolved in a dihydroxy benzene compound having the formula:

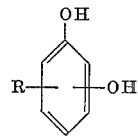

wherein R is a member selected from the group consisting of hydrogen, alkyl groups containing from 1 to 4 carbon atoms, chlorine and bromine. More particularly, this invention relates to a shaped object of the class described hereinabove which is in the form of an adhesive stick or an adhesive pencil which is useful as an applicable bonding agent for bonding two or more layers of a linear thermoplastic polyester resin film by applying heat and pressure to the coated area of the film so as to bond the two layers in superimposed relationship.

Reference is made to the U.S. Pat. 3,329,173, Skoggard and Post, issued July 4, 1967, which discloses a flattened, re-expandable, reinforced pipe which is prepared by wrapping glass fibers coated and/or impregnated with a thermosetting resin around a collapsible mandrel wherein said mandrel is a tubular film of a thermoplastic material. Said patent is incorporated herein by reference. Although this tubular mandrel may be any one of a plurality of thermoplastic films which have been formed into the shape of a tubular member, it is preferred that the thermoplastic tubular member be a linear thermoplastic polyester resin film such as those prepared by reacting a glycol such as ethylene glycol with a dicarboxylic acid free of non-benzenoid unsaturation such as terephthalic acid. These linear thermoplastic polyester resin films are available commercially from a plurality of sources. To produce the laminates from these thermoplastic films, one merely applies the shaped object of the present invention to the surface of the film in the area where bonding is to be achieved and the second layer of the polyester resin film is superimposed thereon and heat and pressure are applied to the superimposed structure so as to achieve the bonding of the films together. The amount of heat applied should be sufficient to provide for the softening or melting of the dihydroxy benzene compound in the shaped object, adhesive stick or pencil but insufficient to melt the linear polyester resin film which melts at a substantially higher temperature. Since the dihydroxy benzene compounds in the solid solution are present in preponderant amounts when compared with the content of the polyester resin film dissolved in the shaped object and since the dihydroxy benzene compounds soften or melt at a temperature significantly lower than the softening and melting temperature of the polyester film in the shaped object, no problem is encountered in accomplishing the bonding step.

The shaped object of the present invention is readily prepared by introducing a predetermined quantity of a selected dihydroxy benzene compound as defined generically hereinabove and generically and specifically hereinbelow into a suitable container which container will provide the cross sectional outline for the shaped object. Thereupon the container is heated to a temperature above the melting temperature of the selected dihydroxy benzene compound. While in the molten state, predetermined weighed quantities of the linear thermoplastic polyester resin are introduced into the molten dihydroxy benzene compound. The dihydroxy benzene compound seemingly has a voracious appetite for the linear thermoplastic polyester resin. The polyester resin is readily assimilated into the molten dihydroxy benzene compound. Stirring of the molten solution is accomplished in order to insure substantially completely uniform distribtuion of the polyester resin material throughout the dihydroxy benzene compound. The amount of the linear thermoplastic polyester resin which is dissolved in the dihydroxy benzene compound and which becomes a part of the solid solution thereof in the form of a shaped object may be varied between about 2% and 20% by weight based on the total weight of the solid solution. Preferably one would use between about 2.5% and 7.5% by weight, same basis. When amounts less than about 2% of the linear thermoplastic polyester resin are used, the ultimate shaped object lacks cohesive force due to the presence of exceedingly large quantities of the dihydroxy benzene compound; and as a consequence, there is insufficient cohesive strength in the shaped object thus produced. On the other hand when the amount of the linear thermoplastic polyester resin dissolved in the dihydroxy benzene compound is appreciably greater than about 20%, the ultimate shaped object has cohesive strength, but when used as an adhesive stick or pencil the bond achieved by the two films of such a linear thermoplastic polyester resin is insufficient and there is not enough strength in the bond to be acceptable.

Among the dihydroxy benzene compounds which may be used in preparing the laminated structure of the present invention are ortho-dihydroxy benzene otherwise known as pyrocatechin, also known as catechol, meta-dihydroxy benzene otherwise known as resorcinol and para-dihydroxy benzene otherwise known as hydroquinone. These three compounds are preferred because of their commercial availability in adequate quantities and because of their comparatively low prices. However, sustituted dihydroxy benzene compounds can readily be used for this purpose wherever available such as dihydroxy benzene compounds substituted in any of the available positions on the ring by an alkyl group containing from one to four carbon atoms such as tertiary butyl catechol, or by a halogen atom such as chlorine and bromine, such as chloro hydroquinone, 4-chloro resorcinol, bromo hydroquinone and 2-bromo resorcinol.

In order that the concept of the present invention may be more completely understood, the following examples are set forth in which all parts are parts by weight unless otherwise indicated.

Example 1

Into a suitable forming vessel, namely a test tube, there is introduced 98 parts of resorcinol. The resorcinol is heated to about 108°–112° C. and there is introduced in incremental portions sufficient pre-weighed amounts of a linear thermoplastic polyester resin film (Mylar) in order to provide about 2% by weight of the polyester resin film based on the total weight of the resorcinol and the polyester resin film. The solution in the fluid state is thoroughly stirred so as to make substantially complete distribution of the polyester resin in the resorcinol. Thereupon the total solution is permitted to solidify by cooling to room temperature. The test tube is then carefully broken and removed from the formed object. The formed object thus produced in the shape of an adhesive stick or pencil was useful in applying a bond to a pair of linear thermoplastic polyester resin films which were then heat and pressure consolidated.

Examples 2–5, inclusive

Example 1 was repeated in all essential details except that in Example 2, 2½% by weight of the polyester resin film was dissolved in 97.5 parts of the molten resorcinol; in Example 3, 5 parts by weight of the polyester resin film was dissolved in 95 parts of the resorcinol; in Example 4, 10 parts of the polyester resin film was dissolved in 90 parts of the resorcinol; and in Example 5, 20 parts of the polyester resin film were dissolved in 80 parts of the resorcinol. In each instance when the molten solution, after thorough stirring, had been cooled down to room temperature, the test tube was broken and the formed object removed. The resulting stick was rubbed over a polyester resin film test as in Example 1 on a hot plate until the 4 inches of the surface of the film was completely covered with the molten adhesive. The results of the test in the bond achieved are shown in the table hereinbelow:

TABLE I

| Concentration of Mylar, percent by weight | Chart run inches, ± | Average load, lbs./ inch |
|---|---|---|
| 2.5 | 2 | ¹ 0.95 |
| 5 | 1.5 | ¹ 0.90 |
| 10 | 1.5 | ¹ 0.45 |
| 20 | 2 | ¹ 0.55 |

±Sample time at this point; all peel test samples were 4″ long.
¹ Specimen tore; single value.

Example 6

Example 3 is repeated in all essential details except that in the place of the 95 parts of resorcinol there was substituted 95 parts of hydroquinone. The resulting formed object imparted comparable bonding of the two films.

Example 7

Example 3 is repeated in all essential details except that in the place of the 95 parts of resorcinol there was substituted 95 parts of catechol. Again, comparable results were achieved.

I claim:
1. A shaped object comprising a solid solution of from about 2% to 20% by weight of a linear thermoplastic polyester resin dissolved in a dihydroxy benzene compound having the formula:

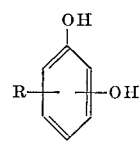

wherein R is a member selected from the group consisting of hydrogen, alkyl groups containing from 1 to 4 carbon atoms, chlorine and bromine.
2. The shaped object according to claim 1 in which the object is in the form of an adhesive stick.
3. The shaped object according to claim 1 in which the polyester resin is dissolved in the dihydroxy benzene compound in an amount varying between about 2.5% and 7.5% by weight.
4. The shaped object according to claim 2 in which the polyester resin is dissolved in the dihydroxy benzene compound in an amount varying between about 2.5% and 7.5% by weight.
5. The shaped object according to claim 1 in which the dihydroxy benzene compound is resorcinol.
6. The shaped object according to claim 1 in which the dihydroxy benzene compound is hydroquinone.
7. The shaped object according to claim 1 in which the dihydroxy benzene compound is catechol.
8. The shaped object according to claim 2 in which the dihydroxy benzene compound is resorcinol.
9. The shaped object according to claim 2 in which the dihydroxy benzene compound is hydroquinone.

10. The shaped object according to claim 2 in which the dihydroxy benzene compound is catechol.

References Cited
UNITED STATES PATENTS
| | | | |
|---|---|---|---|
| 2,982,754 | 5/1961 | Sheffer et al. | 260—33.4 |
| 3,434,916 | 3/1969 | Braunisch et al. | 161—231 |
| 3,444,130 | 5/1969 | Rosenbrock et al. | 260—33.4 |

OTHER REFERENCES
Chemical Abstracts, vol. 59: 7756e.

MORRIS LIEBMAN, Primary Examiner

S. L. FOX, Assistant Examiner

U.S. Cl. X.R.

156—332; 161—231